United States Patent
Garza, Jr.

(10) Patent No.: US 11,441,704 B2
(45) Date of Patent: Sep. 13, 2022

(54) STANDS FOR A CONDUIT

(71) Applicant: Ray Garza, Jr., Sugar Land, TX (US)

(72) Inventor: Ray Garza, Jr., Sugar Land, TX (US)

(*) Notice: Subject to any disclaimer, the term of this patent is extended or adjusted under 35 U.S.C. 154(b) by 98 days.

(21) Appl. No.: 16/575,085

(22) Filed: Sep. 18, 2019

(65) Prior Publication Data

US 2021/0080030 A1  Mar. 18, 2021

(51) Int. Cl.
*F16L 3/02* (2006.01)
*F16L 3/20* (2006.01)
*F16L 3/01* (2006.01)

(52) U.S. Cl.
CPC ............... *F16L 3/02* (2013.01); *F16L 3/01* (2013.01); *F16L 3/20* (2013.01)

(58) Field of Classification Search
CPC ....... F16L 3/00; F16L 3/01; F16L 3/02; F16L 3/20; F16L 3/003; F16L 59/022; F24F 13/0254; E01F 5/005; A62C 33/04; B05B 15/60; B05B 15/625
USPC ............................... 138/106; 248/75, 80–88
See application file for complete search history.

(56) References Cited

U.S. PATENT DOCUMENTS

| | | | | |
|---|---|---|---|---|
| 147,402 A * | 2/1874 | Ingersoll | ............ | E21B 7/02 173/144 |
| 414,881 A * | 11/1889 | Grams | ............ | B05B 15/622 248/88 |
| 575,700 A * | 1/1897 | Charbonneau | ...... | A62C 31/28 248/84 |
| 883,969 A * | 4/1908 | Meskill | ............ | B05B 15/625 248/81 |
| 929,392 A * | 7/1909 | Cole | ............ | B05B 15/625 248/81 |
| 1,007,657 A * | 10/1911 | Freund | ............ | B05B 15/625 248/83 |
| 1,192,313 A * | 7/1916 | Howell | ............ | B05B 15/625 248/81 |
| 1,873,672 A * | 8/1932 | Theys | ............ | B05B 15/625 248/83 |
| 1,962,263 A * | 6/1934 | Tracy | ............ | B05B 15/625 239/282 |
| 2,025,895 A * | 12/1935 | Praeger | ............ | B05B 15/625 248/84 |
| 2,442,904 A * | 6/1948 | Reeh | ............ | B05B 15/622 248/81 |
| 2,622,829 A * | 12/1952 | Waltz | ............ | A01K 97/10 248/511 |
| 2,712,424 A * | 7/1955 | Dion | ............ | A01G 25/00 248/49 |
| 2,736,525 A * | 2/1956 | Jones | ............ | F16L 3/00 248/83 |
| 3,554,474 A * | 1/1971 | Davies | ............ | F16L 3/00 248/49 |
| 4,403,758 A * | 9/1983 | Burt | ............ | F16L 3/26 248/49 |
| 5,452,872 A * | 9/1995 | Barnes | ............ | B05B 15/622 248/81 |
| 2006/0091279 A1 * | 5/2006 | Jones | ............ | F16L 3/02 248/431 |

* cited by examiner

*Primary Examiner* — Christopher Garft
(74) *Attorney, Agent, or Firm* — Conley Rose, P.C.

(57) ABSTRACT

Stands for a conduit are disclosed. In an embodiment, the stand includes a body including a receptacle configured to receive the conduit therein. In addition, the stand includes a leg pivotably coupled to the body. The leg is pivotable relative to the body between: a first position, wherein the leg extends along the body, and a second position, wherein the leg extends away from the body.

20 Claims, 4 Drawing Sheets

STANDS FOR A CONDUIT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Conduits may be utilized to transport a fluid stream and/or electric current. Some conduits may be configured to transport a liquid, such as, for instance water. The liquid may be emitted from the conduit into a vessel, or onto the ground, an object, or a structure as desired during operations. In some circumstances, a conduit may be utilized to provide a stream of liquid to a desired location for an extended period of time.

BRIEF SUMMARY

Some embodiments disclosed herein are directed to a stand for a conduit. In an embodiment, the stand includes a body including a receptacle configured to receive the conduit therein. In addition, the stand includes a leg pivotably coupled to the body. The leg is pivotable relative to the body between: a first position, wherein the leg extends along the body, and a second position, wherein the leg extends away from the body.

In some embodiments, the stand includes a body including a longitudinal axis, a first end, and a second end opposite the first end. In addition, the body includes a receptacle extending along the longitudinal axis from the first end to the second end. The receptacle is configured to receive the conduit therein. Further, the stand includes a leg pivotably coupled to the body. The leg is configured to pivot relative to the body to adjust an angle between the leg and the longitudinal axis. The leg is configured to engage with a support surface.

Still other embodiments disclosed herein are directed to a hose stand. In an embodiment, the hose stand includes an elongate body including a longitudinal axis, and an axially extending receptacle. The receptacle includes an opening that is configured to receive a hose therethrough in a radial direction with respect to the longitudinal axis. In addition, the hose stand includes a leg pivotably coupled to the body on a side of the body that is opposite the opening of the receptacle. The leg is pivotable relative to the body between: a first position, and a second position, in which the leg is pivoted outward from the body, away from the first position.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
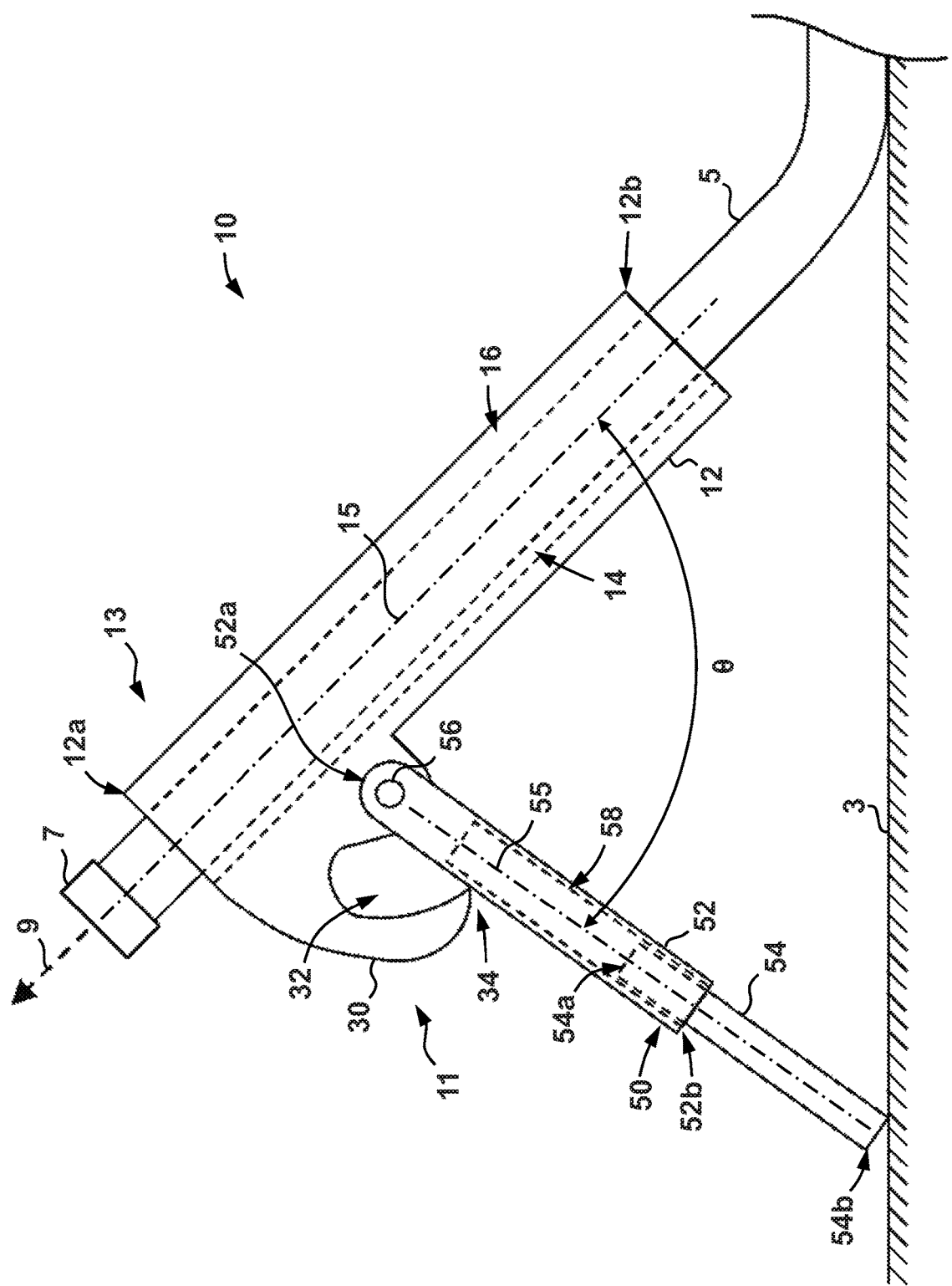
FIG. 1 is a side view of a stand for a conduit according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As previously described, in some circumstances a conduit may be utilized to provide a stream of fluid (e.g., liquid) to a desired location for an extended period of time. For instance, a liquid carrying conduit (e.g., a water hose) may be positioned to emit liquid into a space so as to allow one to immerse hands, tools, or other objects in the fluid stream for washing or other purposes. In these circumstances, an individual utilizing the conduit to provide the liquid stream may find it difficult to maintain the conduit in a desired position (e.g., to provide the liquid stream to the desired location) while simultaneously immersing a hand, tool or other object in the emitted liquid stream. Accordingly, embodiments disclosed herein include stands for a conduit that may support a conduit during operations so as to allow the liquid stream to be delivered to a desired location. Thus, as will be described in more detail below, through use of the examples stands disclosed herein, a user may immerse hands or other objects in the liquid stream emitted from the conduit without needing to simultaneously support and/or manipulate the conduit.

Figure 2:
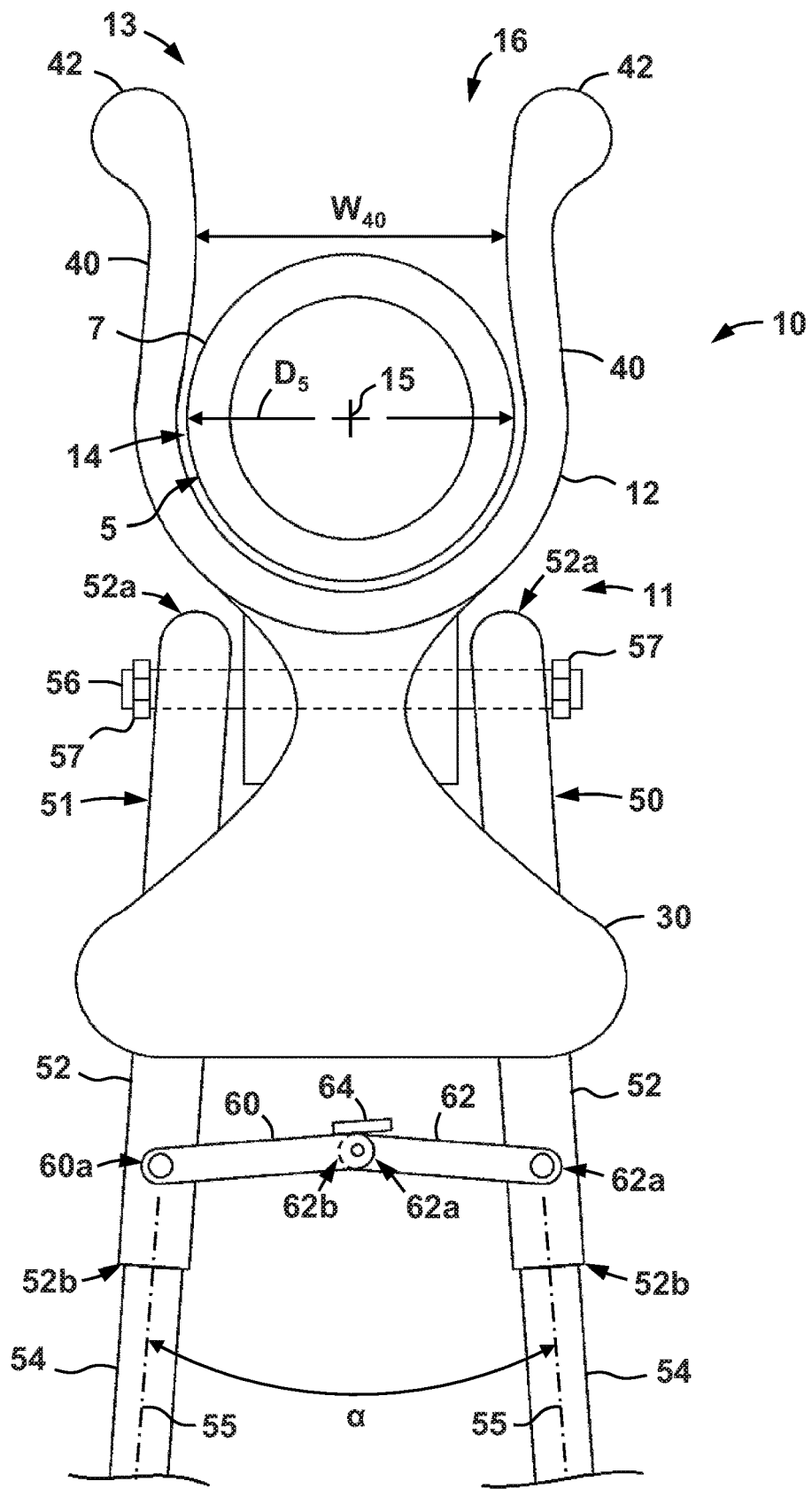
FIG. 2 is a front view of the stand of FIG. 1 according to some embodiments.

Referring now to FIGS. 1 and 2, a stand 10 for a conduit 5 according to some embodiments is shown. In some embodiments (e.g., such as the embodiment of FIGS. 1 and 2), the conduit 5 is a water hose, such as a garden hose or similar. Thus, stand 10 may be referred to herein as a "hose stand." During operations, conduit 5 may emit a stream of water (e.g., fluid stream 9) from an open end 7 (or nozzle, or spray attachment coupled to open end 7). Generally speaking, stand 10 comprises a body 12 and a plurality of legs 50, 51 pivotably coupled to body 12. In particular and as best shown in FIG. 2, in this embodiment, stand 10 includes a first leg 50 and a second leg 51 both pivotably coupled to body 12.

Body 12 comprises a central or longitudinal axis 15, a first or front end 12a, and a second or rear end 12b opposite front end 12a. A receptacle 14 is defined within body 12 that extends axially from front end 12a to rear end 12b. Receptacle 14 includes an opening 16 that also extends axially between ends 12a, 12b along body 12 so that body 12 has a generally U-shaped cross-section as shown in FIG. 2. Thus, during operations, conduit 5 may be inserted within receptacle 14 in a radial direction with respect to axis 15.

As best shown in FIG. 2, body 12 includes a pair of elongate arms 40 that are spaced form one another to form opening 16 into receptacle 14. The arms 40 may have distal ends 42 that are extended away from axis 15 and receptacle 14. In some embodiments (e.g., such as the embodiment of FIGS. 1 and 2), the distal ends 42 may diverge away from one another so as to receive conduit 5 therethrough when inserting conduit 5 radially within receptacle 14 as previously described above.

In addition, as is also best shown in FIG. 2, a minimum span or distance $W_{40}$ between the arms 40 at the opening 16 that may be less than or equal to an outer diameter $D_5$ of conduit 5. Further, the arms 40 (and potentially all of body 12 as described in more detail below) may be constructed from a generally resilient material (e.g., polymer, fiberglass, carbon fiber, metal, etc.), such that the arms 40 may elastically flex and deflect during operations without resulting in plastic or permanent deformation thereto. Thus, during operations, a user may push conduit 5 through opening 16 in a radial direction relative to axis 15 between arms 40 into receptacle 14. During this process, the relatively larger outer diameter $D_5$ of conduit 5 (e.g., relative to minimum span $W_{40}$) may cause the conduit 5 to engage with arms 40, so that arms 40 are flexed or displaced apart from one another to allow conduit 5 to advance through opening 16 and into receptacle 14. In some embodiments, the radial dimensions of receptacle 14 may be larger or equal to the outer diameter $D_5$. As a result, when conduit 5 is fully received within receptacle 14 past the minimum span $W_{40}$ within opening 16, the arms 40 may move back toward one another to partially enclose or surround conduit 5, and therefore prevent conduit 5 from being unintentionally removed from receptacle 14 (e.g., in a radial direction with respect to axis 15).

Referring still to FIGS. 1 and 2, body 12 may include a hook 30 that extends generally radially outward from body 12. In this embodiment, hook 30 extends outward form body 12 at or near front end 12a; however, other locations for hook 30 are contemplated in other embodiments. In addition, the hook 30 may extend outward from body 12 (e.g., such as generally radially outward as previously mentioned above) on a side 11 of body 12 that is radially opposite (e.g., with respect to axis 15) a side of the body 13 that includes the receptacle 16. Stated more plainly, in this embodiment hook 30 is disposed on an opposite side of body 12 from receptacle 14.

Figure 3:
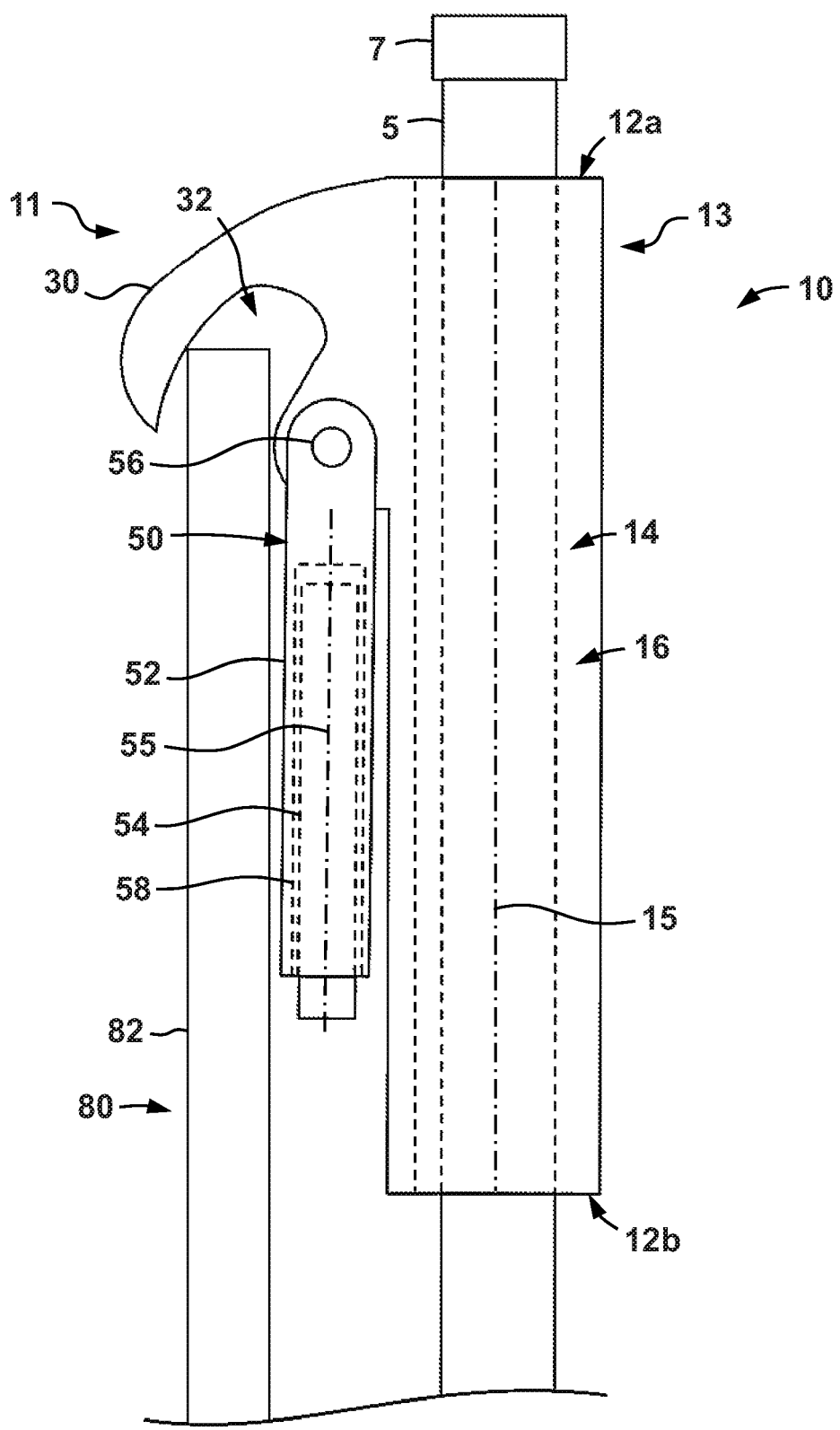
FIG. 3 is a side view of the stand of FIG. 1 suspended from a structure according to some embodiments.

Hook 30 defines a cavity 32 that may receive a suitable support structure to hang or suspend body 12 during operations. For instance, referring briefly now to FIG. 3, in some embodiments, hook 30 may be used to suspend or hang body 12 (with or without conduit 5 inserted within receptacle 14) from a suitable structure 80, which may comprise a fence, railing, rail, rack, pipe, line, etc. In the embodiment of FIG. 3, the structure 80 comprises a fence, and the hook 30 is engaged with a fence board 82 of the fence 80 such that a top of the fence board 82 is received within cavity 32. As a result, stand 10 (and possibly conduit 5) may be suspended in an elevated position when not in use so as to decrease the risk of trips or falls caused by stand 10, and/or damage to stand 10 by persons or equipment during operations.

Referring now to FIGS. 1-3, body 12 may comprise any suitable material or combination of materials for holding and supporting conduit 5 during operations. For instance, as previously described, in some embodiments body 12 (including the arms 40 and receptacle 14) may comprise a resilient material that may be elastically deformed or flexed without resulting in plastic deformation. For instance, in some embodiments, body 12 may comprise a metallic material, a polymer, carbon fiber, fiberglass, resin, etc. In some embodiments, body 12, including receptacle 14, and arms 40 may monolithically formed as single piece unitary body. For instance, in some embodiments, body 12, including receptacle 14 and arms 40, may be molded (e.g., via vacuum molding, press molding, or any other suitable molding process) out of a polymer or resin material.

Referring again to FIGS. 1 and 2, in some embodiments legs 50, 51 may each comprise a first or outer housing 52 pivotably coupled to body 12 and a second or inner leg member 54 telescopically disposed within the outer housing 52. FIG. 1 shows further details of the outer housing 52 and inner leg member 54 for leg 50; however, it should be appreciated that outer housing 52 and inner leg member 54 of leg 51 are configured the same such that the following description of leg 50 may be applied to fully describe leg 51.

Referring specifically to FIG. 1, outer housing 52 of leg 50 includes a first or proximate end 52a, and a second or distal end 52b opposite proximate end 52a. In addition, outer housing 52 includes a receptacle or cavity 58 extending from distal end 52b toward proximate end 52a along a central or longitudinal axis 55. Inner leg member 54 includes a first or proximate end 54a, and a second or distal end 54b opposite proximate end 54a. Inner leg member 54 is inserted axially within cavity 58 along axis 55 such that proximate end 54a is disposed within cavity 58 and distal end 54b is disposed outside of cavity 58 axially past distal end 52b of outer housing 52.

During operations, inner leg member 54 may be telescopically moved axially into and out of cavity 58 (e.g., relative to axis 55) to adjust a total length of leg 50, which may be measured axially from proximate end 52a of outer housing 52 to distal end 54b of inner leg member 54 along axis 55. In some embodiments, inner leg member 54 may be adjusted to a finite number of predetermined extension positions from cavity 58, so that leg 50 has a finite number of predetermined lengths. For instance, inner leg member 54 may include a spring loaded extension (not shown) that may align with and extends into a plurality of holes, recesses, or apertures spaced along the length of outer housing 52.

In other embodiments, inner leg member 54 may be placed in an infinite number of extension positions within cavity 58, so that leg 50 effectively has an infinite number of lengths between a minimum value and a maximum value. For instance, inner leg member 54 may include a cam member (not shown) that engages with a suitable profile (not shown) within cavity 58 when inner leg member 54 is rotated about axis 55 in a first direction relative to outer housing 52 to thereby lock or secure an axial position of inner leg member 54 relative to outer housing 52 during operations. However, when it is desired to adjust an axial length of leg 50, inner leg member 54 may be rotated about axis 55 relative to outer housing 52 in a second direction that is opposite the first direction to thereby disengage the cam on inner leg member 54 from the profile within outer housing 52, and allow inner leg member 54 to axially extend or retract within cavity 58 along axis 55.

Referring still to FIG. 1, leg 50 may be pivotably coupled to body 12 via an elongate pin member 56. In particular, pin member 56 extends through outer housing 52 near proximate end 52a. Thus, during operations, leg 50 may be pivoted about pin member 56 so as to adjust an angle θ between the axis 15 of body 12 and axis 55 of leg 50. For instance, as shown in FIG. 3, leg 50 may be rotated so as to extend substantially along body 12 (e.g., so that axis 55 is substantially parallel to axis 15 and the angle θ is substantially zero). In addition, as best shown in FIG. 1, leg 50 may be rotated about pin member 56 relative to body 12 so that the angle θ is increased. In some embodiments, leg 50 may engage with hook 30 so as to define a maximum value for the angle θ during operations. As a result, in these embodiments (e.g., such as the embodiment of FIG. 1), the hook 30 may form a stop 34 for legs 50, 51. In some embodiments, stop 34 may engage with legs 50 to limit the angle θ to less than 180°, such as less than 100°, or approximately 90° in some embodiments. Thus, during operations, the legs 50, 51 may be pivotable between a first position in which the legs 50, 51 extend along the body 12 (see e.g., FIG. 3), and a second position in which the legs 50, 51 extend away from the body 12. The second position may include the fully extended position wherein the legs 50, 51 are engaged with the stop 34 (see e.g., FIG. 1), or may include any of the number of positions between this fully extended position and the first position.

Referring again to FIG. 2, a pair of spacer arms 60, 62 are pivotably coupled between the arms 50, 51. In particular, as shown in FIG. 2, the spacer arms 60, 62 are pivotably coupled between the outer housings 52 of arms 50, 51. A first spacer arm 60 is pivotably coupled to outer housing 52 of leg 51, a second spacer arm 62 is pivotably coupled to outer housing 52 of leg 50, and the spacer arms 60, 62 are pivotably coupled to one another.

First spacer arm 60 has a first end 60a, and a second end 60b opposite the first end 60a. Similarly, second spacer arm 62 has a first end 62a, and a second end 62b opposite first end 62a. First end 60a of first spacer arm 60 is pivotably coupled (e.g., pinned) to outer housing 52 of leg 51, second end 62a of second spacer arm 62 is pivotably coupled (e.g., pinned) to outer housing 52 of leg 50, and second end 60b and first end 62a of spacer arms 60 and 62, respectively, are pivotably coupled (e.g., pinned) to one another.

During operations, spacer arms 60, 62 may be pivoted about ends 60a, 60b, 62a, 62b to adjust a spacing between the legs 50, 51. Without being limited to this or any other theory, as the spacing or span between legs 50, 51 increases, a stability of the stand 10 may generally increase. Thus, the spacer arms 60, 62 may be rotated so as to generally increase a spacing between the legs 50, 51 when stand 10 is deployed to support conduit 5 on a support surface (e.g., the ground) as described in more detail below.

A stop 64 may be mounted to one or both of the spacer arms 60, 62 that is configured to limit a relative rotation of spacer arms 60, 62 during operations. In particular, in the embodiment of FIG. 2, stop 64 is mounted along first spacer arm 60. When arms 60, 62 are pivoted about ends 60a, 60b, 62a, 62b to a fully extended state or arrangement (e.g., such as when spacer arms 60, 62 are generally aligned with one another between legs 50, 51) the stop 64 may engage with second spacer arm 62 so as to limit further pivoting of arms 60, 62.

Referring still to FIG. 2, as the spacer arms 60, 62 are pivoted to an aligned and fully extended position, the legs 50, 51 may generally be forced apart from one another so as to increase an angle α between the axes 55 of legs 50, 51. In some embodiments, when the arms 60, 62 are pivoted to a fully extended state as described above, the angle α may range from 0° to less than about 180°, such as from about 30° to about 90°, or from about 45° to about 70°. This relative rotation or flaring of the legs 50, 51 may be generally facilitated by a number of features. For instance, as shown in FIG. 2, the proximate ends 52a of outer housings 52 are generally rounded so as to provide some clearance between body 12 and proximate ends 52a to allow for the rotation of legs 50, 51 (e.g., to increase or decrease the angle α) as the spacer arms 60, 62 are pivoted about their respective ends 60a, 60b, 62a, 62b as previously described above. In other embodiments, alternative shapes (e.g., other than the rounded ends 52a shown in FIG. 2) may be used for outer housing 52 and body 12 so as to provide sufficient clearance between body 12 and outer housings 52 to facilitate the above described relative rotation or flaring of legs 50, 51 during operations.

In addition, the elongate pin member 56 may pivotably couple both legs 50, 51 to body 12 as previously described. As is also shown in FIG. 2, the elongate pin member 56 extends through the body 12 and through the outer housings of legs 50, 51. Nuts 57 are threaded to the elongate pin member 56 outside of the outer housings 52 so as to secure legs 50, 51 along pin member 56. However, in this embodiment, the legs 50, 51 may slidingly engage with pin member 56 so as to allow for the rotation of legs 50, 51 (e.g., to increase or decrease the angle α) as the spacer arms 60, 62 are pivoted about their respective ends 60a, 60b, 62a, 62b as previously described above.

Referring again to FIGS. 1 and 2, during operations, conduit 5 may be inserted into receptacle 14 (e.g., radially through opening 16 as previously described), and legs 50, 51 may be rotated away from body 12 and engaged with a support surface 3 (e.g., the ground, a slab, a table, etc.). During this process, legs 50, 51 may be rotated until they abut or engage with stop 34, thereby maximizing the angle θ. In addition, the length of the legs 50, 51 may be adjusted by translating the inner leg members 54 within the cavities 58 of outer housings 52 along axes 55 as previously described above. Once the legs 50, 51 are deployed (e.g., rotated, length-adjusted, etc.) the distal ends 54b of inner leg members 54 are engaged with the support surface 3 so as to support conduit 5 in a desired position and/or orientation.

Thereafter, a fluid stream 9 (e.g., such as a stream of water) may be emitted from open end 7 of conduit 5. The angle or direction of fluid stream 9 may be adjusted via adjustments to the lengths of legs 50, 51 as well as by rotating legs 50, 51 about the pin member 56. Once a desired direction of fluid stream 9 is achieved via the above described adjustments to stand 10 (e.g., particularly to legs 50, 51), this direction may be maintained by stand 10 so that a user may then immerse hands, tools, objects, etc. in the fluid stream 9 for washing or other operations without simultaneously holding or otherwise engaging conduit 5 or stand 10.

During the above described operations, conduit 5 may also engage with support surface 3 and thereby aid in stabilizing stand 10 along support surface 3 as generally shown in FIG. 1. However, in other embodiments, rear end 12b of body 12 may engage with support surface 3 so as to provide an additional point of contact with the support surface 3 so as to further stabilize stand 10 and conduit 5 during operations.

Figure 4:
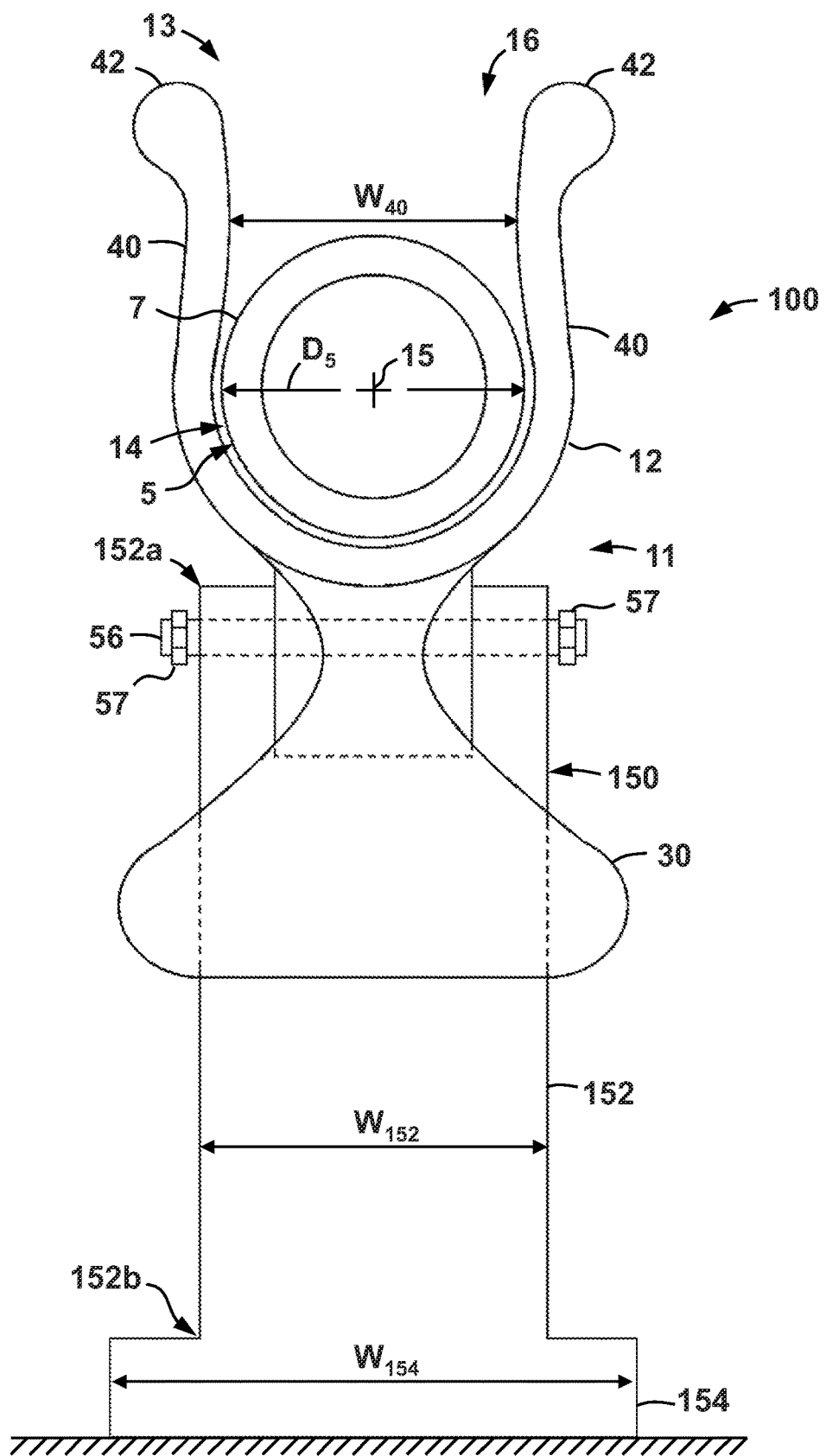
FIG. 4 is a side view of a stand for a conduit according to some embodiments.

Referring now to FIG. 4, a stand 100 for a conduit 5 according to some embodiments is shown. Because conduit 5 may comprise a water hose in some embodiments as previously described above, stand 100 may be referred to herein as a "hose stand." Stand 100 may be generally the same as stand 10, and thus, components of stand 100 that are shared with stand 10 are identified with the same reference numerals, and the discussion below will focus on the features of stand 100 that are different from stand 10. In particular, stand 100 includes body 12, but in place of legs 50, 51, stand 100 includes a single leg 150 pivotably coupled to body 12.

Leg 150 includes a column 152 pivotably coupled to body 12 and a foot 154 for engaging with support surface 3 during operations. Column 152 includes a first or proximate end 152a, and a second or distal end 152b opposite proximate end 152a. Column 152 is pivotably coupled to body 12 at or near proximate end 152a via elongate pin member 56. Thus, during operations leg 150 may be pivotable relative the body 12 (e.g., via pin member 56) between a first position in which the leg 150 extends substantially along the body 12, and a second position in which the leg 150 extends away from the body 12, in a similar manner to that described above for legs 50, 51 of stand 10.

In addition, foot 154 is engaged with column 152 at distal end 152b. Column 152 and foot 154 may be formed as separate members or bodies that are joined or coupled to one another to form leg 150. However, in some embodiments, column 152 and foot 154 may be formed (e.g., molded, stamped, cut, cast, etc.) as a monolithic, unitary, single-piece body.

Column 152 may include a width $W_{152}$ and foot 154 may include a width $W_{154}$. Widths $W_{152}$, $W_{154}$ extend in a direction that is generally perpendicular to a direction of axis 15 of body 12. The width $W_{154}$ of foot 154 may be larger than the width $W_{152}$ of column 152. As a result, foot 154 may engage with support surface 3 over a relatively large surface area so as to provide stability to stand 100 during operations. In some embodiments, the width $W_{154}$ may be adjustable. For instance, one or more extendable members or legs may be coupled to the foot 154, so that during operations, a user may pivot or linearly extend the extensions to thereby increase the width $W_{154}$ during operations. By providing for an adjustable width $W_{154}$, the foot 154 may be placed in a collapsed or reduced-width state when leg 150 is pivoted about pin member 56 to extend along the body 12, so as to decrease an overall width of the stand 100.

The operations with stand 100 are essentially the same as those previously described above for stand 10; however, rather than deploying or rotating legs 50, 51 away from body 12, the leg 150 is rotated about the elongate pin member 56 so as to extend foot 154 away from body 12 as generally shown in FIG. 2. During these operations, the column 152 may engage with stop 34 (e.g., formed by hook 30) so as to limit a maximum rotation of leg 150 during operations in substantially the same manner as previously described above for legs 50, 51 (see e.g., the angle θ in FIG. 1). Once deployed, the leg 150 and body 12 may support conduit 5 in a desired position to deliver a fluid stream (e.g., such as fluid stream 9 previously described above) to a desired location and/or at a desired angle.

The embodiments disclosed herein include stands (e.g., stands 100, 100) for a conduit (e.g., conduit 5) that may support the conduit during operations so as to allow the liquid stream to be delivered to a desired location. Thus, through use of the examples stands disclosed herein, a user may immerse hands or other objects in a liquid stream emitted from the conduit without needing to simultaneously support and/or manipulate the conduit.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A stand for a conduit, the stand comprising:
    a body including a longitudinal axis and a receptacle configured to receive the conduit therein, wherein the body has a first end and a second end spaced from the first end along the longitudinal axis;
    a hook coupled to the body such that the hook is fixed relative to the body, wherein the hook has a first portion, a second portion, and a terminal end, wherein the first portion extends radially outward from the body, and wherein the second portion extends from the first portion away from the first end and toward the second end to the terminal end; and
    a leg pivotably coupled to the body, wherein the leg is pivotable relative to the body between:
        a first position, wherein the leg extends along the body; and
        a second position, wherein the leg is pivoted from the first position toward the first end such that the leg extends away from the body and contacts the terminal end of the hook to limit further rotation of the leg toward the first end.

2. The stand of claim 1, wherein the leg comprises:
    an elongate column including a first end and a second end, wherein the first end is pivotably coupled to the body; and
    a foot coupled to the second end of the column, wherein the foot is configured to engage with a support surface when the leg is in the second position.

3. The stand of claim 2, wherein the receptacle extends along the longitudinal axis, wherein the foot has a width in a direction that is perpendicular to a direction of the longitudinal axis, and wherein the width of the foot is wider than a corresponding width of the column.

4. The stand of claim 1, comprising a second leg pivotably coupled to the body,
wherein the leg and the second leg each comprise:
an outer housing pivotably coupled to the body; and
an inner leg member telescopically disposed within the outer housing.

5. The stand of claim 4, comprising a pair of spacer arms pivotably coupled between the leg and the second leg, wherein a first spacer arm of the pair of spacer arms is pivotably coupled to the leg, wherein a second spacer arm of the pair of spacer arms is pivotably coupled to the second leg, and wherein the first spacer arm and the second spacer arm are pivotably coupled to one another.

6. A stand for a conduit, the stand comprising:
a body including a longitudinal axis, a first end, and a second end opposite the first end, and comprising a receptacle extending along the longitudinal axis from the first end to the second end, wherein the receptacle is configured to receive the conduit therein;
a hook that extends outward from the body to a terminal end, wherein the hook defines a cavity that is configured to receive a support structure inserted into the cavity axially toward the first end and away from the second end with respect to the longitudinal axis; and
a leg pivotably coupled to the body, wherein the leg is configured to pivot relative to the body to adjust an angle between the leg and the longitudinal axis, wherein the leg is configured to engage with a support surface, wherein the terminal end of the hook is arranged to contact the leg to limit a rotation of the leg relative to the body toward the first end and away from the second end.

7. The stand of claim 6, wherein the receptacle is generally U-shaped in radial cross-sectional view relative to the longitudinal axis such that the conduit may be inserted into the receptacle in a radial direction relative to the longitudinal axis.

8. The stand of claim 6, wherein the body comprises a pair of axially extending arms, wherein a space between the arms forms an opening into the receptacle.

9. The stand of claim 8, wherein each of the arms includes a distal end extending away from the receptacle, wherein the distal ends of the arms diverge away from one another.

10. The stand of claim 6, wherein the leg comprises:
an elongate column including a first end and a second end, wherein the first end of the column is pivotably coupled to the body; and
a foot coupled to the second end of the column, wherein the foot is configured to engage with a support surface.

11. The stand of claim 6, comprising a second leg pivotably coupled to the body,
wherein the leg and the second leg each comprise:
an outer housing pivotably coupled to the body; and
an inner leg member telescopically disposed within the outer housing.

12. A hose stand, comprising:
an elongate body including a longitudinal axis, a first end, a second end spaced from the first end along the longitudinal axis, and an axially extending receptacle, wherein the receptacle includes an opening that is configured to receive a hose therethrough in a radial direction with respect to the longitudinal axis;
a hook having a first portion extending radially outward from the body and a second portion extending axially from the first portion to a terminal end, wherein the hook defines a cavity configured to receive a support structure therein in an axial direction with respect to the longitudinal axis, wherein the cavity has an opening that faces away from the first end and toward the second end; and
a leg pivotably coupled to the body on a side of the body that is opposite the opening of the receptacle, wherein the leg is pivotable relative to the body between:
a first position in which the leg is spaced from the hook; and
a second position, in which the leg is pivoted outward from the body, toward the first end to contact the terminal end of the hook such that the terminal end limits further rotation toward the first end from the second position.

13. The hose stand of claim 12, wherein when the leg is in the first position, the leg extends substantially parallel to the longitudinal axis.

14. The hose stand of claim 12, wherein the leg comprises:
an outer housing pivotably coupled to the body; and
an inner leg member telescopically disposed within the outer housing.

15. The stand of claim 1, comprising a projection extending radially outward from the body, wherein the projection defines the hook, and wherein the leg is pivotably coupled to the projection.

16. The stand of claim 1, wherein the hook is axially closer to the first end than the second end with respect to the longitudinal axis of the body, and wherein when the leg is in the second position, an angle θ extending between a longitudinal axis of the leg and the longitudinal axis of the body along a portion of the body extending axially between the hook and the second end is 100° or less.

17. The stand of claim 6, comprising a projection extending radially outward from the body, wherein the projection defines the hook, and wherein the leg is pivotably coupled to the projection.

18. The stand of claim 6, wherein the hook is axially closer to the first end than the second end with respect to the longitudinal axis of the body, and wherein when the leg contacts the hook, an angle θ extending between a longitudinal axis of the leg and the longitudinal axis of the body along a portion of the body extending axially between the hook and the second end is 100° or less.

19. The hose stand of claim 12, comprising a projection extending radially outward from the body, wherein the projection defines the hook, and wherein the leg is pivotably coupled to the projection.

20. The hose stand of claim 12, wherein the hook is axially closer to the first end than the second end with respect to the longitudinal axis of the body, and wherein when the leg is in the second position, an angle θ extending between a longitudinal axis of the leg and the longitudinal axis of the body along a portion of the body extending axially between the hook and the second end is 100° or less.

* * * * *